FOSTER & HART.
Nut Machine.
No. 3,223. Reissued Dec. 8, 1868.
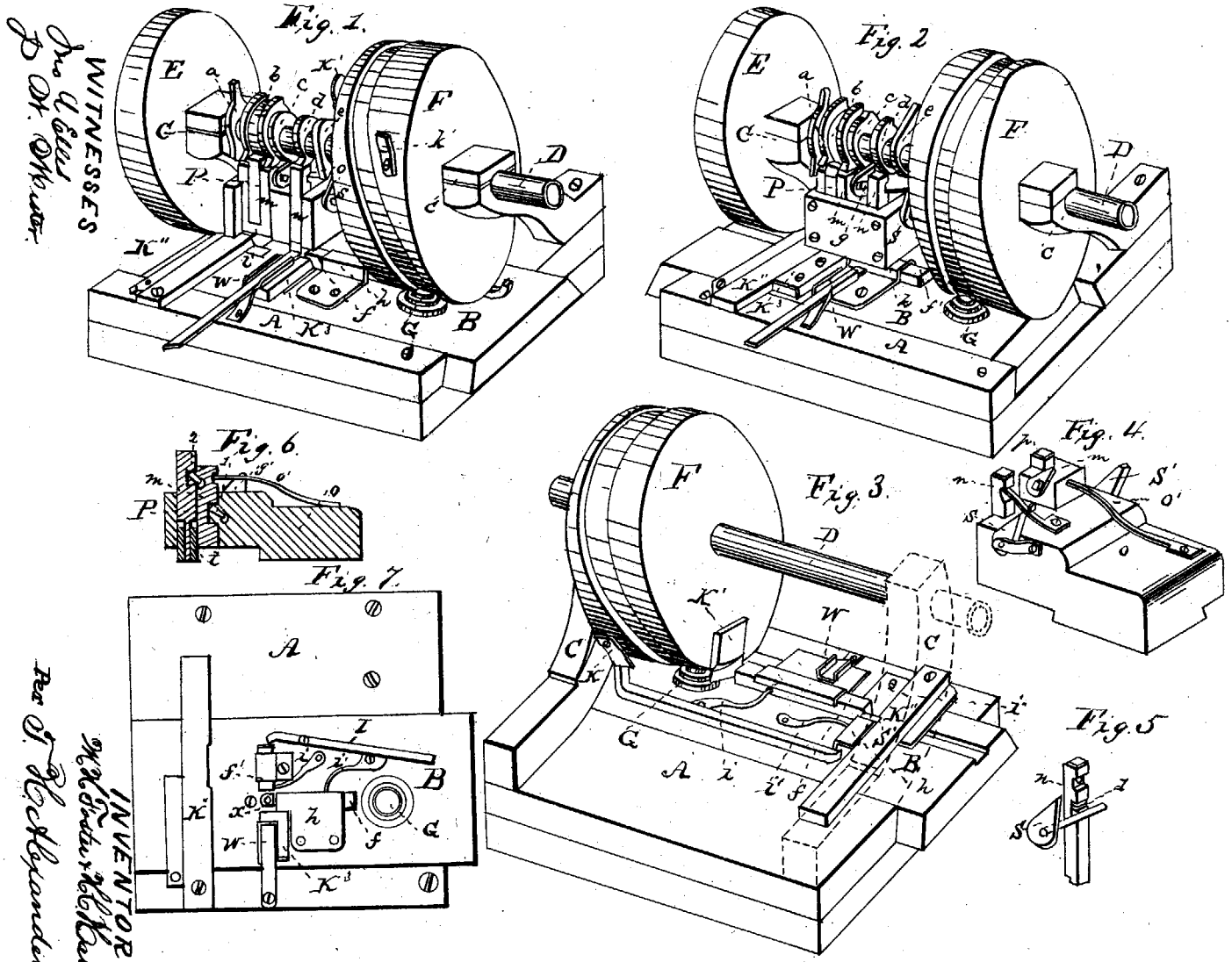
WITNESSES
Jno. A. Ellis
D. H. Winter
INVENTOR
M. H. Foster & H. C. Hart
Per T. H. Alexander.
N. PETERS, Photo-Lithographer, Washington, D. C.

United States Patent Office.

MATTHEW H. FOSTER AND HUBERT C. HART, OF UNIONVILLE, CONNECTICUT.

*Letters Patent No.* 77,476, *dated May* 5, 1868; *reissue No.* 3,223, *dated December* 8, 1868.

IMPROVEMENT IN MACHINE FOR MAKING NUTS.

The Schedule referred to in these Letters Patent and making part of the same.

*To all whom it may concern:*

Be it known that we, MATTHEW H. FOSTER and HUBERT C. HART, of Unionville, in the county of Hartford, and State of Connecticut, have invented certain new and useful Improvements in Machines for Making Nuts; and we do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1 is a perspective view, showing the cutter in the act of severing the nut.

Figure 2 is a perspective view, representing the punch down.

Figure 3 is a perspective view of the reversed side of the machine, showing the mode of operating the formers.

Figure 4 is a perspective view of the block, detached from the machine.

Figure 5 is a perspective view, showing the cutter and lifter detached.

Figure 6 is a section of the block, showing the mode of operating the punch.

Figure 7 is a plan, showing the formers in position when not in operation.

A represents the main bed, furnished with a longitudinal dovetailed recess, in which is fitted and slides the bed-piece B.

At each end of the main bed A, are secured the supports C C, upon which the shaft D has its bearings, said shaft being retained in its position by boxes, in the usual way.

E is the driving-wheel or pulley, and

F, a cam-grooved wheel, by means of which motion is communicated to the movable bed or carriage B.

Both of these wheels are fixed to the shaft D, in the position shown in figs. 1 and 2.

*a*, *b*, *c*, *d*, and *e* are five cams, arranged on the shaft D, as seen in the same figures.

The cam *b*, it will be observed, is a triple one.

The peculiar offices of these cams will be shown hereafter.

G is a metal button, which works in the cam-shaped groove in the wheel F. This button is so secured to the bed B that it will revolve when the wheel is in motion, thus avoiding the rubbing friction which would otherwise occur.

By means of this device, motion is communicated, from the wheel F, to the movable bed-piece or carriage B.

*f f′* are two metal formers, working at right angles to each other, as seen in figs. 3 and 7.

Former *f* slides beneath the casing *h*, and *f′* beneath *h′*, as shown in figs. 1, 2, and 3.

Each of these formers is supplied with springs, *i i′*, which force them back into their original positions when relieved from pressure.

I is a lever, pivoted to the bed-piece B, one end resting against the outer end of the former *f′*, while its opposite end is turned up and bevelled on one of its sides, as shown in fig. 3.

*k* is a stiff metal plate, secured upon the periphery of the wheel F. The plate is so formed that, in the revolution of the wheel, it will engage the lever I, and cause it to operate the former *f′*.

*k′* is a metal plate, secured to the inner side of the wheel F, as shown in fig. 3. The lower inner side of this plate is bevelled, and by it the former *f* is operated.

It should be particularly observed that the positions of these plates should be such as to work both of the formers at the same time.

*k″* is a metal bar, secured to the main bed A.

$k^3$ is likewise a metal bar, secured to the bed-piece B, immediately opposite the former *f′*.

The use of these bars will be shown hereafter.

*x* is a shallow concave metal die on the bed-piece B, fig. 7.

O is a solid block, of the general form shown in figs. 4 and 6. This block is firmly secured to the bed A, and extends over the bed-piece or carriage B, so that it comes under the shaft D, upon which are the cams *a b c d e*. The end under the shaft is provided with two vertical slots, in which the slide *m* and cutter *n* work, as seen in figs. 1, 2, and 4.

*o o′* are springs, which assist in pressing up the cutter and slide, when relieved by the cams *b* and *d*.

It will be observed that the cutter *n*, the slide *m*, and the punch *p*, as seen in figs. 4, 5, and 6, are provided with notches or slots, in which rest lifters, marked 1, 2, and 3. These lifters are set on small shafts, one of which is seen in fig. 5.

On the ends of these shafts are cams, *s*, *s′*, and *s″*, as shown in fig. 4. The object of these cams is to throw up the cutter, slide, and punch, after they have been pressed down by the cams *b* and *d*.

The cam *b* being a triple one, the two outside parts operate the slide *m*, and the middle one operates the punch *p*, as shown in figs. 1 and 2.

*t* is a metal set, at the lower end of the slide *m*, for forcing the metal of the nut into the die *x*. This set has a hole through it, sufficiently large to allow the punch to work freely.

W is a guide, for conducting the bar of metal to the cutter.

The operation of our invention is as follows:

Motion is given to the shaft D, carrying the cams, by means of a band passing over the pulley E. The bar of metal, from which the nuts are to be cut, is introduced into the guide W, and pushed forward, when the cutter *n* descends, and cuts off the proper length for a nut, which falls into the concave die $x$. The bed-piece or carriage B then moves forward by the cam-wheel F, so as to bring the die $x$ under the set $t$, when the formers $f$ and $f'$ close upon the blank, to square the edges and hold it in place, and the slide $m$, carrying the set $t$, descends, and presses the blank into the die or swage $x$, to give it the proper shape. The formers $f$ $f'$ are then withdrawn, and the punch $p$ descends, while the nut is firmly held by the set $t$, and punches the hole through the centre. The set and punch then rise together, carrying the nut with them on the punch, and the bed-piece B moves back to its first position. The slide $m$ then moves downward, under the pressure of the cam, and pushes off the nut from the punch $p$, which is withdrawn, dropping it into a groove, in which it is carried forward, and passed out of the machine by the movement of the bed-piece B. When the bed-piece B has returned to its first position, another blank is cut off, and the operation is repeated.

*Claim.*

What we claim as our invention, and desire to secure by Letters Patent, is—

1. The combination of the sliding bed B with the mechanism for cutting, the mechanism for forming, and the mechanism for punching and swaging, substantially as described.

2. The arrangement of the formers $f$ $f'$, the blocks $k''$ $k^3$, the set $t$, the die $x$, and the punch $p$, constructed and operated as herein described.

3. The peculiar arrangement of the cams $a$ $b$ $c$ $d$ $e$ $s$ $s'$ $s''$ F, by which the several parts of the machine are made to operate at the proper time, substantially as herein set forth.

4. The improved nut-machine, consisting of mechanism constructed, combined, and arranged substantially as herein set forth.

In witness whereof, we hereunto set our hands, this 3d day of July, 1868.

MATTHEW H. FOSTER.
HUBERT C. HART.

Witnesses:
HERMAN NORTHROP,
MARY E. FOSTER.